United States Patent
Fiebag et al.

(10) Patent No.: US 7,553,607 B2
(45) Date of Patent: *Jun. 30, 2009

(54) INTERLAYER FOR LITHOGRAPHIC PRINTING PLATES

(75) Inventors: Ulrich Fiebag, Nienstadt (DE); Hans-Joachim Timpe, Osterode/Harz (DE); Ursula Muller, Herzberg am Harz (DE)

(73) Assignee: Kodak Graphic Communications, GmbH, Osterode (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/573,793

(22) PCT Filed: Aug. 25, 2005

(86) PCT No.: PCT/EP2005/009202

§ 371 (c)(1), (2), (4) Date: Feb. 16, 2007

(87) PCT Pub. No.: WO2006/021446

PCT Pub. Date: Mar. 2, 2006

(65) Prior Publication Data

US 2008/0160444 A1    Jul. 3, 2008

(30) Foreign Application Priority Data

Aug. 27, 2004  (DE) .................. 10 2004 041 609

(51) Int. Cl.
*G03F 7/26*   (2006.01)
*G03C 1/00*   (2006.01)

(52) U.S. Cl. .................... 430/302; 430/270.1

(58) Field of Classification Search .............. 430/270.1, 430/302
See application file for complete search history.

(56) References Cited

U.S. PATENT DOCUMENTS

| | | | |
|---|---|---|---|
| 6,294,318 B1 * | 9/2001 | Matsumoto et al. | 430/331 |
| 2002/0187427 A1 * | 12/2002 | Fiebag | 430/292 |
| 2008/0092763 A1 * | 4/2008 | Strehmel et al. | 101/467 |
| 2008/0206666 A1 * | 8/2008 | Baumann et al. | 430/270.1 |

FOREIGN PATENT DOCUMENTS

EP   1 260 866   11/2002

* cited by examiner

*Primary Examiner*—Cynthia H Kelly
*Assistant Examiner*—Chanceity N Robinson
(74) *Attorney, Agent, or Firm*—J. Lanny Tucker

(57) ABSTRACT

Lithographic substrate comprising (a) a dimensionally stable plate- or foil-shaped support, (b) an aluminum oxide layer provided on at least one side of the support (a), and (c) a hydrophilic layer applied onto the aluminum oxide layer comprising at least one phosphono-substituted siloxane of the general formula (I).

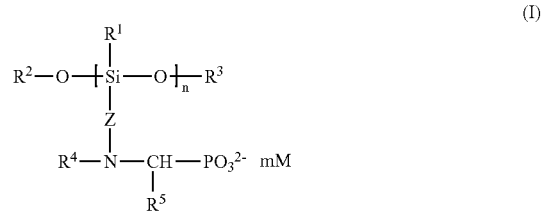

16 Claims, No Drawings

INTERLAYER FOR LITHOGRAPHIC PRINTING PLATES

The present invention relates to substrates for lithographic printing plates, in particular lithographic substrates with an interlayer comprising of phosphono-substituted siloxanes. The invention furthermore relates to lithographic printing plate precursors and lithographic printing plates comprising such a lithographic substrate, as well as to a process for the production of such a lithographic substrate.

The technical field of lithographic printing is based on the immiscibility of oil and water, wherein the oily material or the printing ink is preferably accepted by the image area, and the water or fountain solution is preferably accepted by the non-image area. When an appropriately produced surface is moistened with water and a printing ink is applied, the background or non-image area accepts the water and repels the printing ink, while the image area accepts the printing ink and repels the water. The printing ink in the image area is then transferred to the surface of a material such as paper, fabric and the like, on which the image is to be formed. Generally, however, the printing ink is first transferred to an intermediate material, referred to as "blanket", which then in turn transfers the printing ink onto the surface of the material on which the image is to be formed; this technique is referred to as offset lithography.

Usually, a lithographic printing plate precursor (in this context the term "printing plate precursor" refers to a coated printing plate prior to exposure and developing) comprises a radiation-sensitive coating applied onto a substrate, usually on aluminum basis. If a coating reacts to radiation such that the exposed portion becomes so soluble that it is removed during the developing process, the plate is referred to as "positive working". On the other hand, a plate is referred to as "negative working" if the exposed portion of the coating is hardened by the radiation so that it remains on the substrate during developing. In both cases, the remaining image area accepts printing ink, i.e. is oleophilic, and the non-image area (background) accepts water, i.e. is hydrophilic. The differentiation between image and non-image areas takes place during exposure. Usually, an aqueous alkaline developer whose pH value is usually in the range of 9 to 13.5 is used to remove the more soluble portions of the coating.

Independently of the type of material the substrate is made from, e.g. aluminum foils, plastic films or paper, the majority of commercially available printing plate precursors has an aluminum oxide layer on the substrate surface since it exhibits a high degree of mechanical abrasion resistance necessary during the printing process. On the one hand, this oxide layer is already hydrophilic to some degree, which is significant for repelling the printing ink; however, on the other hand, it is so reactive that it can interact with components of the radiation-sensitive layer. The aluminum oxide layer can cover the surface of the substrate completely or partially.

Usually, a substrate, in particular an aluminum substrate with aluminum oxide layer, is provided with a hydrophilic protective layer (also referred to as "seal", "sublayer" or "interlayer") before the radiation-sensitive layer is applied. This hydrophilic layer improves the water acceptance of the (non-printing) background areas of a lithographic printing plate and improves the repulsion of the printing ink in these areas. A suitable protective layer also ensures that during developing the soluble portions of the radiation-sensitive layer are removed easily and residue-free from the substrate so that clean background areas are obtained during printing. Without such a residue-free removal, what is referred to as toning would occur during printing, i.e. the background areas would accept printing ink. Without a suitable protective layer, the aluminum layer can be stained by dyes that are present as so-called exposure indicators or colorants in the radiation-sensitive layers ("staining"); furthermore, the correctability of a printing plate can be made more difficult. On the other hand, the adhesion of the image areas on the aluminum oxide layer should not be affected by the hydrophilic layer or should even be improved. The interlayer should also protect the aluminum oxide layer against corrosion during developing with a strongly alkaline developer (pH value>11.5). Otherwise, such an attack would lead to a sludging of the developer bath.

Document DE 25 327 69 A1 describes lithographic printing plate precursors on the basis of negative diazo resins having a sodium silicate interlayer. While the adhesion of the image areas to this interlayer is very good, it has been found that the photosensitivity of these plates is greatly affected by storage at elevated temperatures and humidity. Furthermore, the process of applying the interlayer poses problems, for example, drying of the alkaline sodium silicate solution on parts of the apparatus leads to residues which are hard to remove.

The use of polyvinylphosphonic acid or salts thereof as well as copolymers of vinylphosphonic acid with acrylic monomers as sublayers in lithographic printing plate precursors is e.g. suggested in DE 11 34 093 C, U.S. Pat. No. 4,153,461 and EP 0 537 633 B1. However, such a layer does not provide optimum protection for the aluminum oxide layer so that sludging of the developer takes place; furthermore, such printing plates have a tendency to cause toning after the press is re-started.

EP 0 154 200 A1 describes printing plates comprising two sublayers, a silicate layer on the substrate and a PVPA layer on top of that. EP 0 681 221 A1 and EP 0 689 941 C1 also describe combinations of two sublayers. However, the application of two sublayers is complicated and expensive and therefore not desirable from an economic point of view.

U.S. Pat. No. 5,807,659 describes an interlayer obtained by applying a polymer with Si—O—Si bond, with the polymer having been obtained by hydrolysis and polycondensation of an organic silicon compound of the type $SiR_4$ (wherein R is a hydrolysable group) with an organic silicon compound of the type $R_1Si(R_2)_3$ (wherein $R_1$ is an addition reactive functional group and $R_2$ is a hydrolysable alkoxy group or —$OCOCH_3$). However, the use of such an interlayer leads to the problem of toning, especially when the press is re-started.

It is the object of the present invention to provide a lithographic substrate with an inexpensive interlayer which combines good adhesion on the one hand and good developability on the other hand, protects aluminum oxide layers on metallic substrates against corrosion, prevents sludging of the developer, allows re-starting of the press without causing toning problems and furthermore does not affect the sensitivity and storage stability of the radiation-sensitive layer.

This object is achieved by a lithographic substrate comprising (a) a dimensionally stable plate- or foil-shaped support with an aluminum oxide layer provided thereon and (b) a hydrophilic layer applied onto the aluminum oxide layer comprising at least one phosphono-substituted siloxane of the general formula (I)

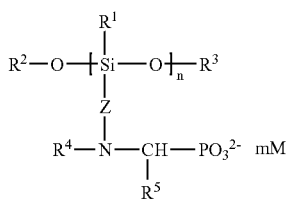

wherein
R¹ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, alkinylaryl, acyloxy group and a group —$CHR^6$—$PO_3^{2-}$, R² and R³ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl group, R⁴ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, R⁵ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, Z represents —$(CR^6R^7)_x$— or arylene, or a combination of two or more thereof, R⁶ and R⁷ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 and x is an integer from 1 to 100, M represents the counterion(s) needed for charge equalization and is selected from monovalent, divalent or multivalent cations, and m is the number of cations needed for charge equalization.

A dimensionally stable plate or foil-shaped material is used as a support on which the aluminum oxide layer is provided. Preferably, a material is used as dimensionally stable plate or foil-shaped material that has already been used as a support for printing matters. Examples of such supports include paper, paper coated with plastic materials (such as polyethylene, polypropylene, polystyrene), a metal plate or foil, such as e.g. aluminum (including aluminum alloys), zinc and copper plates, plastic films made e.g. from cellulose diacetate, cellulose triacetate, cellulose propionate, cellulose phthalate, cellulose acetatebutyrate, cellulose nitrate, polyethylene terephthalate, polyethylene, polystyrene, polypropylene, polycarbonate and polyvinyl acetate, and a laminated material made from paper or a plastic film and one of the above-mentioned metals, or a paper/plastic film that has been metallized by vapor deposition. Among these supports, an aluminum plate or foil is especially preferred since it shows a remarkable degree of dimensional stability and is inexpensive. Furthermore, a composite film can be used wherein an aluminum foil has been laminated onto a plastic film, such as e.g. a polyethylene terephthalate film, or paper, or a plastic film onto which aluminum has been deposited by means of vapor deposition.

The following steps can for example be taken to generate the aluminum oxide layer on the support mentioned above:

A metal support, in particular an aluminum support, is preferably subjected to a treatment selected from graining (e.g. by brushing in a dry state or brushing with abrasive suspensions, or electrochemical graining, e.g. by means of a hydrochloric acid electrolyte) and anodizing (e.g. in sulfuric acid or phosphoric acid). The aluminum oxide layer can also be applied on the above-mentioned supports by means of vapor deposition processes.

Within the framework of the present invention, carriers with an aluminum oxide layer are referred to as "substrate". The aluminum oxide layer can cover the surface of one or both sides of the support completely or partially. In the present invention, a support with both an aluminum oxide layer and an interlayer is referred to as "lithographic substrate".

The details of the above-mentioned support pre-treatment, such as graining and anodizing, are known to the person skilled in the art.

An aluminum foil which preferably has a thickness of 0.1 to 0.7 mm, more preferred 0.15 to 0.5 mm, is an especially preferred support. It is preferred that the foil be grained (preferably electrochemically) and then show an average roughness of 0.2 to 1 μm, especially preferred 0.3 to 0.8 μm.

According to an especially preferred embodiment, the grained aluminum foil was furthermore anodized. The layer weight of the resulting aluminum oxide is preferably 1.5 to 5 g/m², especially preferred 2 to 4 g/m².

For preparing a lithographic substrate according to the present invention, a substrate as described above is provided with an interlayer consisting of one or more phosphono-substituted siloxanes of the general formula (I)

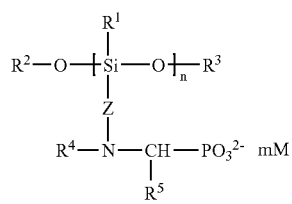

wherein
R¹ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, acyloxy group and a group —$CHR^6$—$PO_3^{2-}$, R² and R³ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl group, R⁴ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, $R^5$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, Z represents —$(CR^6R^7)_x$— or arylene, or a combination of two or more thereof, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 (preferably 1 to 100) and x is an integer from 1 to 100 (preferably 1 to 50, especially preferred 1 to 10), M represents the counterion(s) needed for charge equalization and is selected from monovalent, divalent or multivalent cations, and m is the number of cations needed for charge equalization.

Preferably, the phosphono-substituted siloxane has the general formula (II)

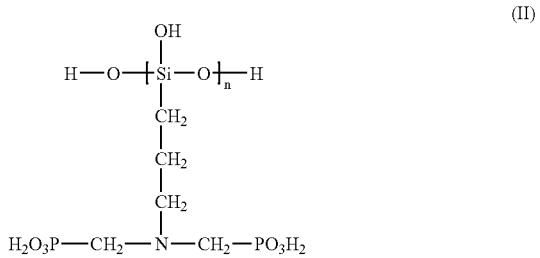

(II)

wherein n is an average value and has a value from 1 to 100.

Depending on the pH value, the siloxane of formula (I) or (II) can also be protonated at the N atom. Thus, whenever reference is made to formula (I) or (II) in this application, the protonated species should be encompassed as well.

Protons as well as alkali or alkaline earth metal ions, ammonium ions or phosphonium ions can for example be used as counterion M. In the case of protons, the compound is then present as a free acid. In an acidic medium (pH range between 1 and 3), the free acids can also be present as acid addition salts, e.g. as hydrochlorides, sulfates etc. At the isoelectric point, betaine-type structures can be present.

When the counterion M is a transition metal cation, the formation of a complex can take place, i.e. there is no actual salt structure. Such complexes are encompassed by the present invention as well.

One possibility of preparing the phosphono-substituted siloxanes of the present invention is the reaction of a suitable aminosiloxane with formaldehyde or a suitable other carbonyl compound and phosphorous acid, whereby the phosphorous acid can for example be prepared by controlled hydrolysis of suitable halogenated phosphorus compounds in situ, e.g. from $PCl_3$.

Such a reaction takes place according to the following reaction scheme (see also Topics in phosphorous chemistry, 8 (1977), pages 527-529):

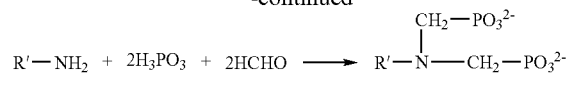

wherein R' carries one or more siloxane groups.

For applying the interlayer onto the aluminum oxide layer, an aqueous solution of the phosphono-substituted siloxane is prepared, wherein the concentration of the siloxane can vary in a wide range but is preferably 0.01 to 10 wt.-% of phosphono-substituted siloxane, more preferred 0.05 to 5 wt.-% and particularly preferred 0.1 to 1 wt.-%. The coating solution can comprise further additives, such as e.g. wetting agents, defoaming agents, mineral acids (as e.g. described in DE 42 03 010 C1) or inorganic salts (as e.g. described in EP 0 537 633 B1). If mineral acids are added, the aqueous interlayer coating solution should preferably have a pH value between 1 and 3.

This solution is then applied using common coating processes such as e.g. dip coating, roller coating, spray coating, bar coating and coating with a slot coater. The coating of the aluminum oxide layer can be carried out at temperatures from 20 to 95° C., but temperatures of 30 to 65° C. are preferred. Generally, the material to be coated is brought into contact with the interlayer solution for 1 second to 2 minutes, preferably 8 to 30 seconds.

An excess of solution applied onto the substrate can be removed by means of a doctor blade, a squeeze roll or by rinsing with water (preferably at a temperature of 20 to 80° C.). However, such steps are not necessarily required.

The substrate treated with the solution is then dried for example in the air or using a hot-air dryer or an infrared dryer. Drying is preferably carried out at a temperature of 30 to 130° C., especially preferred 40 to 80° C.

The interlayer on the aluminum oxide layer can be removed by means of aqueous bases (0.1 molar sodium hydroxide solution is especially suitable) and then the phosphorus or silicon content can be determined by means of suitable methods (e.g. ICP method). However, various surface-sensitive methods (e.g. EDX or SIMS) can be used to directly determine the amount of interlayer deposited on the lithographic substrate. It can be concluded from the thus determined amounts of deposited interlayer that the interlayer layers applied onto the substrate can be continuous or discontinuous, that is, the surface of one or both sides of the substrate is completely or partially covered with it.

The lithographic substrate of the present invention can then be coated with different radiation-sensitive compositions. It is suitable for the production of all types of lithographic printing plate precursors, i.e. both positive working and negative working precursors, which can either be UV/VIS-sensitive or IR-sensitive or heat-sensitive. The precursors can either be single-layer precursors or precursors having a multilayer structure.

After developing, the lithographic substrate of the present invention maintains its excellent hydrophilicity in the non-image areas, and the adhesion of a variety of materials, which function as image areas during printing, to the lithographic substrate of the present invention is very good as well.

The lithographic substrate of the present invention can for example be coated with a negative working UV-sensitive coating on the basis of negative diazo resins as described, inter alia, in EP 0 752 430 B1, a negative working photopolymer layer sensitive to radiation of about 405 nm (see e.g. DE 103 07 451.1), a negative working photopolymer system sensitive to radiation from the visible range of the spectrum (e.g. EP 0 684 522 B1) or a negative working IR-sensitive layer based on free-radical polymerization (e.g. DE 199 06 823 C2).

Furthermore, the lithographic substrate of the present invention can be provided with a positive working UV-sensitive layer based on quinone diazides and novolaks, as described in U.S. Pat. No. 4,594,306, or a positive working IR-sensitive layer on the basis of a mixture of novolaks and IR dyes (see also EP 0 887 182 B1 and EP 1 101 607 A1).

Furthermore, the lithographic substrate of the present invention can be used for negative working single-layer IR-sensitive elements wherein the radiation-sensitive layer is rendered insoluble in or impenetrable by aqueous alkaline developer upon IR irradiation and preferably comprises (i) at least one compound which forms an acid upon application of heat and (ii) a component cross-linkable by an acid, or a mixture thereof and optionally (iii) a binder resin or a mixture thereof.

Such systems are for example described in EP 0 625 728 B1 and EP 0 938 413 B1.

The substrate of the present invention can also be used for positive working dual-layer elements comprising, on the hydrophilic surface of the substrate, a first layer soluble in aqueous alkaline developer whose solubility is not changed by IR irradiation, and on top of that layer a top layer insoluble in aqueous alkaline developer which is rendered soluble in or penetrable by the developer upon IR irradiation.

Known principles can be applied for the top layer:

(a) A polymer insoluble in strongly alkaline aqueous developer (pH>11) is used which is rendered soluble in or penetrably by the developer by IR irradiation; such systems are for example described in U.S. Pat. No. 6,352,812.

(b) A polymer soluble in strongly alkaline aqueous developer (pH>11) is used whose solubility is reduced to such a high degree by a simultaneously present solubility inhibitor that the layer is not soluble or penetrable under developing conditions; the interaction between the polymer and the inhibitor is weakened by IR radiation to such a degree that the irradiated (heated) areas of the layer are rendered soluble in or penetrable by the developer. Such systems are for example described in U.S. Pat. No. 6,352,811 and U.S. Pat. No. 6,358,669. It is not necessary that the polymer and the solubility inhibitor be two separate compounds, but polymers can be used which at the same time have a solubility inhibiting effect, such as e.g. the functionalized resins described in US 2002/0,150,833 A1, U.S. Pat. No. 6,320,018 B and U.S. Pat. No. 6,537,735 B, such as e.g. functionalized novolaks.

(c) A polymer insoluble in aqueous alkaline developer with pH<11 (but soluble at pH>11) is used, which upon IR irradiation becomes soluble in such a developer with pH<11, and the irradiated element is developed with an alkaline developer with pH<11. Such a system is for example described in WO 02/14071.

The present invention is described in more detailed in the following examples; however, they are not intended to restrict the invention in any way.

EXAMPLES

Reference Example (Preparation of Phosphono-substituted Siloxane of Formula II)

460 g $H_3PO_4$ (70%) and 660 g HCl (31%) are mixed at room temperature in a 5 l glass vessel, equipped with a stirrer and a thermostat, and stirred for about 10 minutes. Then 1,200 g of a 22.5% aqueous solution of polycondensated 3-aminopropyltrihydroxysilane are added drop-wise over a time period of 3 hours. During that time, the temperature is held between 60 and 70° C. Then the mixture is heated in a pressure reactor to 100 to 109° C. and 166 g paraformaldehyde are slowly added (within 3 h). Then the phosponomethylation reaction is allowed to proceed for 2 hours at that temperature. Afterwards, liquid is distilled off under atmospheric pressure to a weight loss of 1,300 g in order to reduce the chloride content and remove excess of formaldehyde. The solid content of the remaining high viscous liquid was 50.7 wt %.

Result of elemental analysis of the product:

C 18.46%
H 4.92%
N 4.31%
P 19.08%
Si 8.92%
P/Si ratio=2.14

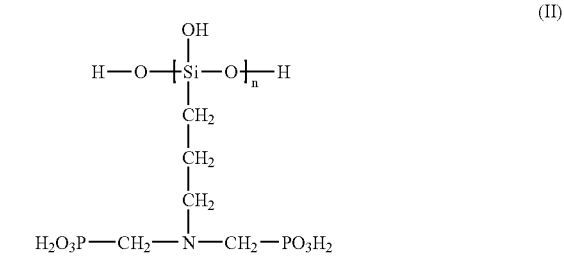

(II)

After the synthesis, the compound mentioned above is present in an aqueous solution as a free acid and in a polymerized state.

The synthesis described above can be used to prepare all the silanes suitable for use in the present invention by adjusting the parameters accordingly.

Another advantageous variant of the synthesis is based on the use of other strong inorganic acids instead of hydrochloric acid, such as e.g. sulfuric acid.

Comparative Example 1

Substrate Without Interlayer

An aluminum foil was grained electrochemically (HCl electrolyte; average roughness 0.6 μm) and then anodized (weight of the oxide: 3.2 g/m²). The resulting substrate will be referred to as "Substrate 1" in the following.

Comparative Example 2

PVPA Interlayer

Substrate 1 obtained in Comparative Example 1 was immersed for 10 seconds at 50° C. in an aqueous solution of polyvinylphosphonic acid (1.5 g/l), then rinsed vigorously with deionized water and dried for 4 minutes at 88° C.

Examples 1 to 5

Interlayers According to the Present Invention

Aqueous solutions of the phosphono-substituted siloxane prepared according to the Reference Example in deionized water with different solids contents were prepared and applied onto a substrate 1 as prepared in Comparative Example 1 by means of a bar coating process, left for 30 seconds, rinsed with deionized water for 30 seconds and dried at 88° C. for 4 minutes. The resulting dry layer weights of the interlayer and the solids contents of the individual solutions can be inferred from Table 1.

The dry layer weight of the interlayer was determined as follows:

The backside of the lithographic substrate was coated with Harz Universal Spezial Rot (available from Enthone, Langenfeld, Germany) and 10 pieces measuring 100 cm² each were cut from each substrate. Each piece was treated for 2 minutes with 50 ml 0.1 N aqueous NaOH and then 2 minutes with 50 ml deionized water. The two solutions were combined and water was added until 100 ml of liquid was reached. The P and Si contents of the solution were determined by means of ICP and the precipitated amount of the siloxane was calculated based thereon.

The dye adsorption behavior of the substrates was examined as follows:

A piece of the substrate was immersed for 1 minute in a 5 wt.-% solution of Acid Violet 17 (C.1.42650), then rinsed with water and dried at room temperature. Then the pieces were examined for blue discoloration with the naked eye.

Attack of the lithographic substrate by the alkaline developer:

The formation of hydrogen bubbles that could be observed due to a first interaction between alkaline developer and lithographic substrate was used as a basis for the determination of the substrate's developer resistance. The developer dwell time that passed until the first bubbles were observed was determined. Goldstar® developer and developer 9005 from Kodak Polychrome Graphics were used as developers, which both have a pH value of about 13. The longer the dwell time, the better the aluminum substrate was protected against the developer by the interlayer.

Also, the following etch test was carried out:

Goldstar® developer was used for this test as well. An aluminum substrate in the form of a strip and coated with an interlayer was immersed in a Goldstar® bath at 20° C. such that a length of 4 cm was covered with developer and left like this for one minute. The process was repeated, wherein each time 4 cm more were immersed and the longest dwell time was 4 minutes.

The resistance to the alkaline attack was evaluated visually by comparing an area of the strip that had not been immersed in developer with the areas that had been immersed for 1, 2, 3 and 4 minutes, respectively.

The following criteria were used:

| | |
|---|---|
| strong attack after 3 to 4 minutes: | 1 |
| clearly visible attack after 4 minutes: | 2 (slight improvement) |
| slight attack after 4 minutes: | 3 (clear improvement) |
| almost no visible attack after 4 minutes: | 4 (very clear improvement) |
| no visible attack after 4 minutes: | 5 (excellent improvement) |

The results for the various lithographic substrates are summarized in Table 1:

TABLE 1

| Example | Interlayer | Interlayer weight (mg/m²) | Acid violet test | Time until $H_2$ formation (s) | Etch test |
|---|---|---|---|---|---|
| Comp. 1 | none | 0 | deep blue | 10 | 1 |
| Comp. 2 | PVPA | 10 | very slightly blue | 45 | 1 |
| 1 | 0.05 wt.-%* PC 1768*** | 47 | slightly blue | 90 | 3 |
| 2 | 0.1 wt.-%* PC 1768 | 55 | very slightly blue | 120 | 4 |
| 3 | 1.25 wt.-%** PC 1768 | 60 | colorless | 120 | 4 |
| 4 | 2.5 wt.-%** PC 1768 | 59 | colorless | 120 | 4 |
| 5 | 5.0 wt.-%** PC 1768 | 63 | colorless | 120 | 4 |

*Temperature of the coating solution 50° C.
**Temperature of the coating solution 20° C.
***PC 1768 has the following structure (II) and was prepared according to the Reference Example:

(II)

TABLE 1-continued

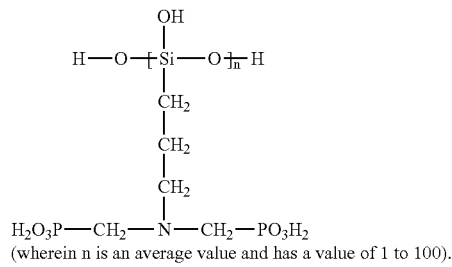

H₂O₃P—CH₂—N—CH₂—PO₃H₂

(wherein n is an average value and has a value of 1 to 100).

Example 6

UV-sensitive Negative Working Printing Plate Precursor According to EP 0 752 430 B1 and Evaluation 1. Preparation of Polyvinyl Acetal In a three-necked flask, equipped with a cooler, a stirrer and a thermometer, 75 g Mowiol 8/88R (polyvinyl alcohol with a content of residual acetyl groups of about 21 wt.-%) were dissolved in 225 ml water and 450 ml n-propanol at 70° C. in a water bath.

The solution was then cooled to 60° C. and 10.2 ml of concentrated hydrochloric acid were added. Then a mixture of 16.2 g butyric aldehyde and 9.9 g acetaldehyde was slowly added dropwise and stirred for 4 hours at 60° C. 10.6 g sodium carbonate dissolved in 50 ml water were added for neutralization and the mixture was stirred for 30 minutes. Then the polymer was precipitated by slowly pouring the mixture into an excess of water, filtered off and dried for 24 hours at 40° C. in a circulating air oven. An analytical examination of the product showed 28 wt.-% vinyl alcohol units.

100 g of the resulting product were dissolved under stirring in 1,500 ml dimethyl sulfoxide. After the addition of 10 g concentrated hydrochloric acid and 43.4 g of the reaction product of maleic acid anhydride with 2-(N-methylamino) acetaldehyde-dimethylacetal according to Preparation Example 1 of DE 195 24 851 A1, the mixture was stirred for 24 hours at about 60° C. The polymeric binder was precipitated in an excess of water and dried in a circulating air oven for 24 hours at 40° C. The analytical examination showed an acid value of 21 mg KOH per gram polymer.

2. Production of the Printing Plate Precursor

A coating solution was prepared from the following components:

4.4 g binder (prepared as described above);
4 g polycondensation product from 1 mole 3-methoxydiphenylamine-4-diazonium-sulfate and 1 mole 4,4'-bis-methoxymethyldiphenylether, precipitated as mesitylene sulfonate;
1.5 g Renolblau B2G-HW® (copper phthalocyanine pigment dispersed in polyvinyl butyral);
0.05 g 4-phenylazodiphenylamine;
0.07 g phosphoric acid.

The above-mentioned components were dissolved under stirring in 200 ml of a mixture consisting of
40 parts by volume methyl glycol,
45 parts by volume methanol and
25 parts by volume methyl ethyl ketone After filtration of the solution, it was applied by means of common processes to the lithographic substrate of Example 2 and the layer was dried for 4 minutes at 88° C. The dry layer weight of the UW-sensitive layer was about 1 g/m².

3. Production of a Printing Plate and Evaluation Thereof

The UV-sensitive coating was exposed with a metal halide lamp (KOR®95 from Theimer) with an energy of 300 mJ/cm² using a silver film half-tone gray scale (UGRA gray scale) having a tonal range of 0.15 to 1.95 (density increments 0.15) as a negative mask. Then developing was carried out using the developer 956 of the company Kodak Polychrome Graphics in the developing unit PT 85 (from Glunz & Jensen, Denmark). The gray scale was covered completely up to step 4 and partially up to step 8. The plate was mounted in a sheet-fed offset press and used for printing using the abrasive printing ink Offset S7184 from Sun Chemical (contains 10% CaCO₃). After only 8 revolutions good copies were obtained. Altogether 150,000 high-quality copies were obtained; during the entire printing process no toning (ink acceptance by the non-image areas) was observed.

For the assessment of storage stability, the unexposed printing plate precursors were stored for 60 minutes in a 90° C. oven, then exposed and developed as described above. The gray scale was covered completely up to step 4 and partially up to step 11; thus, the fresh and the aged plate precursor showed the same degree of UV sensitivity.

Example 7

IR-sensitive Negative Working Printing Plate Precursor According to EP 06 25 728 B1 and Evaluation 1. Production of the Printing Plate Precursor A coating solution was prepared from the following components:

400 g Resol resin BKS-5928 (30 wt.-% solution in a 1:1 mixture of 1-methoxy-2-propanol and methyl ethyl ketone);
400 g Novolak resin N-13 (30 wt.-% solution in a 90:10 mixture of 1-methoxy-2-propanol and acetone);
20 g IR dye S0094 (available from FEW Wolfen);
20 g 2-methoxy-4-aminophenyldiazonium-hexafluorophosphate;
3.5 g triarylmethane dye D11 (available from PCAS, France).

The above components were dissolved under stirring in 4 l 1-methoxy-2-propanol. After filtration of the solution, it was applied by means of common processes to the lithographic substrate of Example 2 and the layer was dried for 4 minutes at 88° C. The dry layer weight of the UV-sensitive layer was about 1.3 g/m².

2. Production of the Printing Plate

The printing plate precursor produced above was cut into 380×615 mm pieces. Image-wise IR irradiation of the precursor was carried out with a Creo Trendsetter 3244 with an energy of 135 mJ/m². The irradiated precursor was heated and developed in a fresh developer 9005. The thus produced printing plate was mounted in a sheet-fed offset press and used for printing using the abrasive printing ink Offset S7184 from Sun Chemical (contains 10% $CaCO_3$). 50,000 high-quality copies were obtained. The background of the printing plate did not accept printing ink, neither at the start of the press nor during printing.

In order to assess the developer resistance of a coated lithographic substrate, the printing plate precursors described above were heated in a continuous furnace at 138° C. and a flow rate of 90 cm/min. The precursors were then developed with a Mercury CTP processing unit from Kodak Polychrome Graphics using 60 l developer 9005 from Kodak Polychrome Graphics (pH 13.4) at 24° C.; in a separate container, regenerated developer 9015 from Kodak Polychrome Graphics was provided which was introduced into the developer bath by means of a pump at a rate of 80 ml per developed m². After 200 plate precursors had been developed, no sludge was observed in the processing unit. This indicates the resistance of the aluminum oxide layer treated with the phosphono-substituted silane to the strongly alkaline developer.

Example 8

UV-sensitive Positive Working Printing Plate Precursor According to EP 1 074 887 A1

1. Production of the Printing Plate Precursor

A coating solution was prepared from the following components:
84 g ester of naphthoquinone-1,2-diazido-5-sulfonic acid chloride and 1,4-dihydroxybenzophenone (reacted to a degree of 85%);
306 g cresol/formaldehyde novolak resin (m-cresol:p-cresol=75:25; Mw=7,000);
4 g 2,4-trichloromethyl-6-[1-(methoxy)-naphthyl)]-1,3,5-triazine;
5.6 g Ethyl Violet (C.I. 42600; triarylmethane dye).

The above components were dissolved under stirring in 4 l methyl glycol. After filtration of the solution, it was applied by means of common processes to the lithographic substrate of Example 3 and the layer was dried for 5 minutes at 100° C. The dry layer weight of the UV-sensitive layer was about 2.0 g/m².

2. Production of the Printing Plate and Evaluation

The printing plate precursors produced above were cut into 380×615 mm pieces, exposed with a metal halide lamp (MH burner, 5,000 W) with an energy of 600 mJ/cm² and then developed in the developer unit PT85PN. For this purpose, 60 l of developer 9005 were used at 24° C. in the developer bath; in a separate container, regenerated developer 9005 from Kodak Polychrome Graphics was provided which was introduced into the developer bath by means of a pump at a rate of 50 ml per developed m². After 200 plate precursors had been developed, no sludge was observed in the processing unit. This indicates the resistance of the aluminum oxide layer treated with the phosphono-substituted silane to the strongly alkaline developer.

Another plate precursor was image-wise exposed with a UGRA gray scale having a tonal range of 0.15 to 1.95 (density increments 0.15) as a positive mask using a metal halide lamp (MH burner; 5,000 W) in order to obtain a positive copy. After developing in a fresh developer 9005 the unexposed areas remained on the substrate while the exposed areas were free up to step 5. The plate was then used on a sheet-fed offset printing machine under common conditions; after 10,000 revolutions the plate was washed with a wash solution consisting of 85 parts by volume gasoline and 15 parts by volume isopropanol. After re-starting of the press, no ink acceptance was observed in the background areas. Altogether, 70,000 high-quality copies were obtained.

Comparative Example 3

Example 7 was repeated, but the substrate obtained in Comparative Example 2 was used as a substrate. Exposure and developing was carried out at described in Example 7.

After 200 plate precursors had been developed, sludge could be observed in the processing unit. This demonstrates that a lithographic substrate with an interlayer according to the present invention shows a greater resistance to developers than a lithographic substrate with a PVPA interlayer.

The invention claimed is:

1. A process for the production of a lithographic substrate comprising:
(a) applying an aqueous solution comprising at least one phosphono-substituted siloxane of the general formula (I)

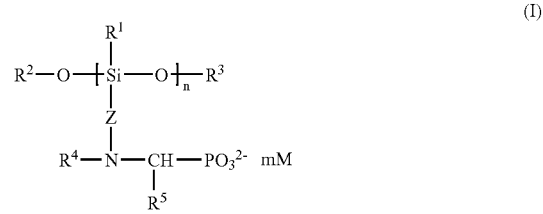

wherein $R^1$ is selected from a hydrogen atom, a hydroxy group, a linear or branched $C_1$-$C_{20}$ alkyl, linear or branched $C_2$-$C_{20}$ alkenyl, linear or branched $C_1$-$C_{20}$ alkoxy, linear or branched $C_2$-$C_{20}$ alkinyl, aryl, arylalkyl, alkylaryl, arylalkenyl, alkenylaryl, arylalkinyl, alkinylaryl, acyloxy group and a group —$CHR^6$—$PO_3^{2-}$, $R^2$ and $R^3$ are independently selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl and alkinylaryl group, $R^4$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, $R^5$ is selected from a hydrogen atom, a linear or branched $C_1$-$C_{20}$ alkyl, linear or branched $C_2$-$C_{20}$ alkenyl, linear or branched $C_2$-$C_{20}$ alkinyl, aryl, arylalkyl, alkylaryl, arylalkenyl, alkenylaryl, arylalkinyl, alkinylaryl group and the group —$CHR^6$—$PO_3^{2-}$, Z represents —$(CR^6R^7)_x$— or arylene, or a combination of two or more thereof, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 and x is an integer from 1 to 100, M represents the counterion(s) needed for charge equalization and is selected from monovalent, divalent or multivalent cations, and m is the number of cations needed for charge equalization;

onto a dimensionally stable plate- or foil substrate with an aluminum oxide layer;

(b) drying at a temperature from 30 to 120° C.

2. The process of claim 1, wherein the dimensionally stable plate- or foil substrate is an aluminum foil which was gained and subsequently anodized.

3. The process of claim 1, wherein the at least one phosphono-substituted siloxane is present in the aqueous solution in a concentration of 0.01 to 10 wt.-%.

4. A lithographic printing plate precursor comprising
(a) a lithographic substrate, and
(b) one or more radiation-sensitive layers applied thereto, wherein the lithographic substrate comprises:
(a) a dimensionally stable plate- or foil support,
(b) an aluminum oxide layer provided on at least one side of the support (a), and
(c) a hydrophilic layer applied onto the aluminum oxide layer comprising at least one phosphono-substituted siloxane of the general formula (I)

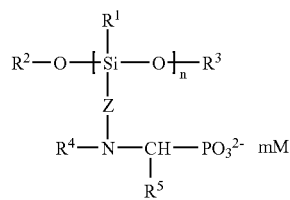

wherein
R$^1$ is selected from a hydrogen atom, a hydroxy group, a linear or branched C$_1$-C$_{20}$ alkyl, linear or branched C$_2$-C$_{20}$ alkenyl, linear or branched C$_1$-C$_{20}$ alkoxy, linear or branched C$_2$-C$_{20}$ alkinyl, aryl, arylalkyl, alkylaryl, arylalkenyl, alkenylaryl, arylalkinyl, alkinylaryl, acyloxy group and a group —CHR$^6$—PO$_3^{2-}$, R$^2$ and R$^3$ are independently selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl and alkinylaryl group, R$^4$ is selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl, alkinylaryl group and the group —CHR$^6$—PO$_3^{2-}$, R$^5$ is selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl, alkinylaryl group and the group —CHR$^6$—PO$_3^{2-}$, Z represents —(CR$^6$R$^7$)$_x$— or arylene, or a combination of two or more thereof, R$^6$ and R$^7$ are independently selected from a hydrogen atom, a linear or branched C$_1$-C$_6$ alkyl, linear or branched C$_2$-C$_6$ alkenyl, linear or branched C$_2$-C$_6$ alkinyl, aryl, arylalkyl, alkylaryl, arylalkenyl, alkenylaryl, arylalkinyl and alkinylaryl group, n is an average value and has a value from 1 to 200 and
x is an integer from 1 to 100, M represents the counterion(s) needed for charge equalization and is selected from monovalent, divalent or multivalent cations, and m is the number of cations needed for charge equalization.

5. The lithographic printing plate precursor of claim 4 wherein the radiation-sensitive layer is a positive working layer.

6. The lithographic printing plate precursor of claim 4 wherein the radiation-sensitive layer is a negative working layer.

7. The lithographic printing plate precursor of claim 4 wherein the radiation-sensitive layer is a UV/VIS-sensitive layer sensitive to radiation from a wavelength selected from the range of 320 to 650 nm.

8. The lithographic printing plate precursor of claim 4 wherein the radiation-sensitive layer is an IR-sensitive layer sensitive to radiation from a wavelength selected from the range of 750 to 1,200 nm.

9. The lithographic printing plate precursor of claim 4 wherein the radiation-sensitive layer is a heat-sensitive layer.

10. A lithographic printing plate precursor comprising
(a) a lithographic substrate, and
(b) an image-wise present oleophilic coating,
wherein the lithographic substrate comprises:
(a) a dimensionally stable plate- or foil support,
(b) an aluminum oxide layer provided on at least one side of the support (a), and
(c) a hydrophilic layer applied onto the aluminum oxide layer comprising at least one phosphono-substituted siloxane of the general formula (I)

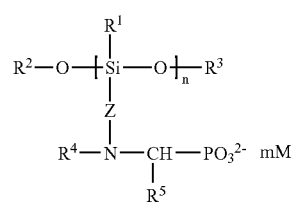

wherein
R$^1$ is selected from a hydrogen atom, a hydroxy group, a linear or branched C$_1$-C$_{20}$ alkyl, linear or branched C$_2$-C$_{20}$ alkenyl, linear or branched C$_1$-C$_{20}$ alkoxy, linear or branched C$_2$-C$_{20}$ alkinyl, aryl, arylalkyl, alkylaryl, arylalkenyl, alkenylaryl, arylalkinyl, alkinylaryl, acyloxy group and a group —CHR$^6$—PO$_3^{2-}$, R$^2$ and R$^3$ are independently selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl and alkinylaryl group, R$^4$ is selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl, alkinylaryl group and the group —CHR$^6$—PO$_3^{2-}$, R$^5$ is selected from a hydrogen atom, a linear or branched C$_1$-C$_{20}$ alkyl, linear or branched C$_2$-C$_{20}$ alkenyl, linear or branched C$_2$-C$_{20}$ alkinyl, aryl, arylalkyl, alkylaryl, arylalkenyl, alkenylaryl, arylalkinyl, alkinylaryl group and the group —CHR$^6$—PO$_3^{2-}$, Z represents —(CR$^6$R$^7$)$_x$— or arylene, or a combination of two or more thereof, $R^6$ and $R^7$ are independently selected from a hydrogen atom, a linear or branched $C_1$-$C_6$ alkyl, linear or branched $C_2$-$C_6$ alkenyl, linear or branched $C_2$-$C_6$ alkinyl, aryl, arylalkyl, alkylaryl, arylalkenyl, alkenylaryl, arylalkinyl and alkinylaryl group, n is an average value and has a value from 1 to 200 and x is an integer from 1 to 100, M represents the counterion(s) needed for charge equalization and is selected from monovalent, divalent or multivalent cations, and m is the number of cations needed for charge equalization.

11. The lithographic printing plate precursor of claim 4 wherein the support (a) is selected from the group consisting of an aluminum foil or plate, a laminated material made from a plastic film and aluminum foil or paper and aluminum foil or a plastic film onto which aluminum has been deposited by means of vapor deposition.

12. The lithographic printing plate precursor of claim 4 wherein prior to the application of the hydrophilic layer, the aluminum was subjected to at least one treatment selected from mechanical graining and electrochemical graining and subsequently an aluminum oxide layer was created on the surface by anodizing.

13. The lithographic printing plate precursor of claim 4 wherein the generated aluminum oxide is present in an amount of 1.5 to 5 $g/m^2$.

14. The lithographic printing plate precursor of claim 4 wherein in formula (I) Z=$(CH_2)_3$ and $R^4$=$CH_2$—$PO_3^{2-}$M.

15. The lithographic printing plate precursor of claim 4 wherein mM=2 $H^+$.

16. The lithographic printing plate precursor of claim 4 wherein mM=2 $Li^+$.

* * * * *